United States Patent
Miller et al.

(10) Patent No.: US 9,378,458 B2
(45) Date of Patent: Jun. 28, 2016

(54) METHOD AND APPARATUS FOR OPERATING A FINITE STATE MACHINE

(71) Applicant: Metaswitch Networks Ltd, Enfield (GB)

(72) Inventors: Craig Miller, Dallas, TX (US); Doug Theobald, Richardson, TX (US)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 14/631,666

(22) Filed: Feb. 25, 2015

(65) Prior Publication Data

US 2015/0170034 A1    Jun. 18, 2015

Related U.S. Application Data

(63) Continuation of application No. 13/688,981, filed on Nov. 29, 2012, now Pat. No. 9,082,073.

(60) Provisional application No. 61/565,154, filed on Nov. 30, 2011.

(51) Int. Cl.
  *G06N 5/02*    (2006.01)
  *H04L 12/54*    (2013.01)
  *G06F 13/38*    (2006.01)

(52) U.S. Cl.
  CPC ............... *G06N 5/02* (2013.01); *G06F 13/385* (2013.01); *H04L 12/54* (2013.01)

(58) Field of Classification Search
  None
  See application file for complete search history.

(56) References Cited

U.S. PATENT DOCUMENTS

| | | | |
|---|---|---|---|
| 7,426,457 | B2 | 9/2008 | Martin et al. |
| 2002/0023256 | A1 | 2/2002 | Seawright |
| 2002/0129178 | A1 | 9/2002 | Steere et al. |
| 2003/0066055 | A1 | 4/2003 | Spivey |
| 2004/0172234 | A1 | 9/2004 | Dapp et al. |
| 2007/0113170 | A1 | 5/2007 | Dignum et al. |
| 2007/0282573 | A1 | 12/2007 | Fritz et al. |
| 2008/0065443 | A1 | 3/2008 | Gorur et al. |
| 2012/0010772 | A1 | 1/2012 | Pack et al. |

FOREIGN PATENT DOCUMENTS

GB    2374954  A    10/2002

*Primary Examiner* — Alan Chen
(74) *Attorney, Agent, or Firm* — EIP US LLP

(57) ABSTRACT

A finite state machine is provided. The finite state machine causes a function to be carried out in dependence on at least an event input to the finite state machine and the current state of the finite state machine. Associations between the functions that are to be carried out and combinations of the states and the events are identified using an associative array. The associations identified using the associative array are amended while the finite state machine is operating to dynamically reconfigure the operation of the finite state machine.

15 Claims, 7 Drawing Sheets

<transition state="Idle" event="Off_Hook">

<eventprocessor name="STATE MACHINE 104" base="STATE MACHINE 103">

<transition /state="E" /event="2" /cond="fsm.MessgeCount > 5">

METHOD AND APPARATUS FOR OPERATING A FINITE STATE MACHINE

CROSS-REFERENCE TO RELATED APPLICATIONS

This application is a continuation of U.S. application Ser. No. 13/688,981, filed on Nov. 29, 2012, which claims the benefit of U.S. Provisional Application No. 61/565,154, filed on Nov. 30, 2011. Each of the above-referenced patent applications is incorporated by reference in its entirety.

BACKGROUND OF THE INVENTION

1. Field of the Invention

The present invention relates to a method of operating a finite state machine, a computer apparatus for operating a finite state machine, and a non-transitory computer-readable storage medium.

2. Description of the Related Technology

A finite state machine is operated on a computer apparatus and can be regarded as a process that can be in one of a finite number of states at any particular time, that state typically being called the current state. The finite state machine can transition to another state and/or cause an action or output to take place when initiated by a triggering event. The state to which the finite state machine moves (the "next state") or the action/output that takes place depends on the current state of the machine and the event that triggered the transition. Thus, the finite state machine design technique allows input stimuli to be handled differently based on the (current) state of a device. A particular finite state machine is defined by a set of the possible states it can transition to from each state, and the triggering condition for each transition. In general, a finite state machine can be implemented in hardware or software or a combination of the two.

Finite state machines are used in many applications and fields, including by way of example only communication protocol design, parsing and other engineering applications, in biology and artificial intelligence research, and in linguistics to describe the grammars of natural languages. The use of finite state machines in telecommunications software in particular is universal, as a telecommunications system needs to react differently to a given input stimulus depending on past events (i.e. typically, its current state).

A simple example of use of a finite state machine in a telecommunications scenario would be to consider what happens when a land-line telephone goes "off hook" (i.e. the handset is lifted). The system that controls the telephone behaves differently depending on whether the telephone is ringing or not. If the telephone is ringing, the off-hook input stimulus causes ringing to stop, a voice path to be established with the calling party and a billing cycle to begin (because an incoming call is being received). If the telephone is not already ringing, a dial tone is played and digit collection begins (because the user has lifted the handset to initiate a call). Thus, the same event (in this simple example, lifting the handset) results in a different action being taken depending on the current state of the device (here, whether the telephone is ringing or not). A finite state machine is typically used to provide this behavior. Finite state machines are used in many other, typically (much) more complex, situations.

As telecommunications systems have evolved, state machines have become increasingly complex. As a particular example, mobile networks have a concept of "presence" (is the phone on) and "location" (where is the phone) which can drive certain finite state machines to behave differently. More possible states and an ever evolving set of input stimulus have added to this complexity. Increasingly, service providers are trying to leverage services that were built on one network technology by applying them to users in so-called next generation networks. This activity involves deriving complex finite state machines to handle interaction between different networks that each have their own set of states and input stimulus.

In most implementations, finite state machines are statically defined using a "jump table". In the simplest case, conceptually a 2 dimensional array is organized such that input stimulus or event and current state are mapped to a particular function. Once the function is performed, the state may change in preparation for the next event. In a finite state machine implemented in software, these jump tables are conventionally usually compiled into the binary source code and cannot be changed without rebuilding and reinstalling the computer program. However, this is very limiting, since each application is different, requiring a different set of states, inputs, and functions, and prevents or hinders easy, rapid development of complex and evolving software systems.

SUMMARY

According to a first aspect of the present invention, there is provided, a computer-implemented method comprising: operating a finite state machine which causes a function to be carried out in dependence on at least an event input to the finite state machine and the current state of the finite state machine; identifying associations between the functions that are to be carried out and combinations of the states and the events using an associative array; and amending the associations identified using the associative array while the finite state machine is operating to dynamically reconfigure the operation of the finite state machine.

By virtue of the associations between the functions that are to be carried out and combinations of the states and the events being stored in an associative array and those associations being amendable, operation of the finite state machine can be dynamically reconfigured "on-the-fly", even whilst the system is running. It is for example not necessary to recompile or reinstall the program that constructs and operates the finite state machine. Operation of the finite state machine can therefore be updated and amended rapidly as necessary. States can be added or removed, and functions or "event handlers" can be added, removed, or replaced, on-the-fly if necessary or desirable. The restrictions of the static jump tables of the prior art, including the inability to change the size of the jump table (to add or remove states and events and their corresponding event handlers) and to amend the way states and events are handled, are obviated.

In an embodiment, the finite state machine is constructed using State Chart eXtensible Markup Language, the associations identified using the associative array being amended by receiving input of an eXtensible Markup Language file and parsing the XML file. This provides users or operators with a relatively easy and familiar way to amend the finite state machine. The XML file can be generated remote from the actual apparatus and transmitted to it over a network, which allows the finite state machine running on the apparatus to be amended and updated remotely.

In an embodiment, at least some of the associations identified using the associative array are indexed in the associative array by use of keys, the keys being a function of the corresponding current state and event for said function. This provides a straightforward mechanism that enables the finite state machine to "locate" the function relating or corresponding to the current state of the finite state machine and the event that is input to the finite state machine.

In an embodiment, at least some of the associations identified using the associative array are indexed in the associative array by use of keys, the keys being non-sequential. In an embodiment, the keys are randomly or pseudorandomly generated. Having keys that are non-sequential, and preferably that are randomly or pseudorandomly generated, greatly facilitates the dynamic updating of the data and associations relating to the functions that are to be carried out as and when that is needed and helps avoid the jump tables being static as in the prior art discussed above.

In an embodiment, wherein at least some of the associations identified using the associative array are stored in a hash table, the index of the location of the data of each of said functions in the hash table being obtained as a hash of identifiers of the corresponding current state and event for said function. The use of hash tables in embodiments discussed further below provides identifiers of the states and events that are unique. The key or index of location is randomly or pseudorandomly generated, and is not for example sequential as in the prior art discussed above.

In an embodiment, at least some of the associations identified using the associative array are accessed using nested hash tables in which at least a first hash table has a second hash table nested therein, one of said hash tables storing identifiers of states of the finite state machine and the other of said hash tables storing identifiers of events.

In an embodiment, the computing apparatus is telecommunications apparatus. State machines can be defined in a telecommunications apparatus such as a network element to manage call legs and perform various translations and call flow modification services. These state machines can for example be used to bridge different network technologies, allowing one network to provide services to users on a different network.

According to a second aspect of the present invention, there is provided, a computer-implemented method comprising: operating a finite state machine which causes a function to be carried out in dependence on at least an event input to the finite state machine and the current state of the finite state machine; identifying associations between the functions that are to be carried out and combinations of the states and the events using an associative array, at least some of the associations identified using the associative array being accessed using nested hash tables in which at least a first hash table has a second hash table nested therein, one of said hash tables storing identifiers of states of the finite state machine and the other of said hash tables storing identifiers of events, the data relating to the functions that are to be carried out being indexed by use of keys that are a hash function of the corresponding current state and event for said function; and amending the associations identified using the associative array while the state machine is running by receiving an eXtensible Markup Language file and parsing the XML file.

According to a third aspect of the present invention, there is provided computing apparatus, the apparatus comprising: at least one processor; and at least one memory; the at least one processor and the at least one memory being configured to cause the apparatus to operate a finite state machine which causes a function to be carried out in dependence on at least an event input to the finite state machine and the current state of the finite state machine, wherein associations between the functions that are to be carried out and combinations of the states and the events are identified using an associative array, the associations identified using the associative array being amendable while the finite state machine is operating to allow the operation of the finite state machine to be dynamically reconfigured.

According to a fourth aspect of the present invention, there is provided a non-transitory computer-readable storage medium comprising a set of computer-readable instructions stored thereon, which, when executed by a processing system, cause the processing system to carry out a method comprising: operating a finite state machine which causes a function to be carried out in dependence on at least an event input to the finite state machine and the current state of the finite state machine; identifying associations between the functions that are to be carried out and combinations of the states and the events using an associative array; and amending the associations identified using the associative array while the finite state machine is operating to dynamically reconfigure the operation of the finite state machine.

According to a fifth aspect of the present invention, there is provided a non-transitory computer-readable storage medium comprising a set of computer-readable instructions stored thereon, which, when executed by a processing system, cause the processing system to carry out a method comprising: operating a finite state machine which causes a function to be carried out in dependence on at least an event input to the finite state machine and the current state of the finite state machine; identifying associations between the functions that are to be carried out and combinations of the states and the events using an associative array, at least some of the associations identified using the associative array being accessed using nested hash tables in which at least a first hash table has a second hash table nested therein, one of said hash tables storing identifiers of states of the finite state machine and the other of said hash tables storing identifiers of events, the data relating to the functions that are to be carried out being indexed by use of keys that are a hash function of the corresponding current state and event for said function; and amending the associations identified using the associative array while the state machine is running by receiving an eXtensible Markup Language file and parsing the XML file.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
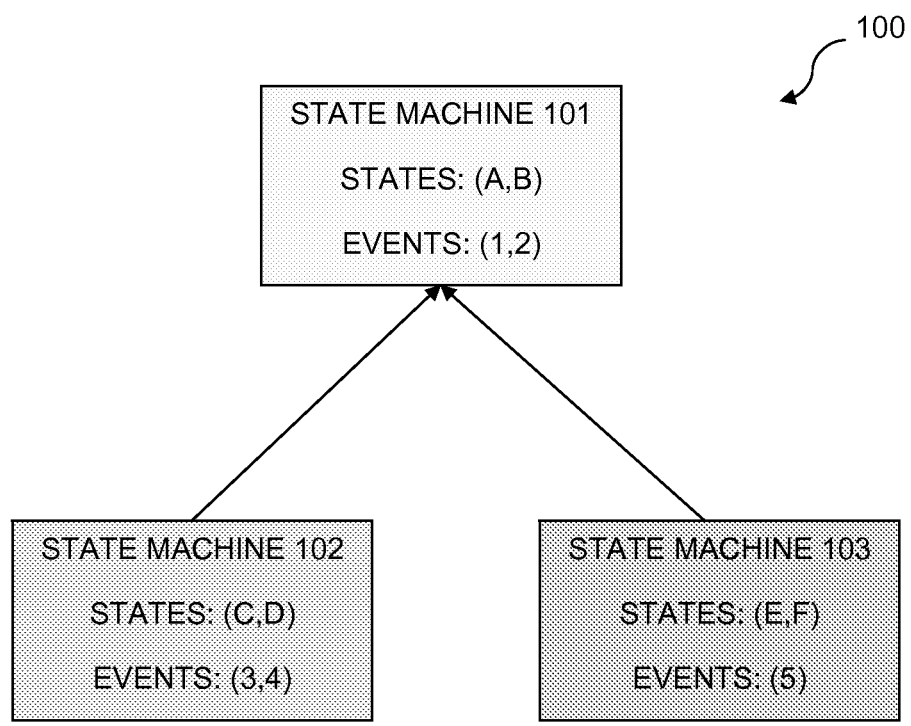
FIG. 1 shows schematically an example of a hierarchical state machine design having a common base class state machine and two subclass state machines.

Referring first to FIG. 1, there is shown a schematic hierarchy diagram of a hierarchical finite state machine 100. In this example, there is a common base class state machine 101 and two subclass state machines 102,103 (which in this example are "leaf" class state machines as there are no further subclass state machines "beneath" them). In this hierarchical structure, the subclass state machines inherit the states and event handlers from their predecessor state machine which is above them in the structure (and which is repeated up the chain of the hierarchical structure). Thus, in FIG. 1, the leaf class state machines 102,103 inherit the states and event handlers from the base class state machine 101. In the particular example shown, the base class state machine 101 consists of states A, B and processes events 1, 2 to initiate a transition to another state or to cause an action or other output to be taken (such transition or action or output often being generically referred to herein as a "function" or an "event handler") depending on the current state and the event concerned. Further, in this example, the first leaf class state machine 102 consists of states A, B, C, and D and processes events 1, 2, 3 and 4, while the other leaf class state machine 103 consists of states A, B, E, and F and processes events 1, 2 and 5.

Figure 2:
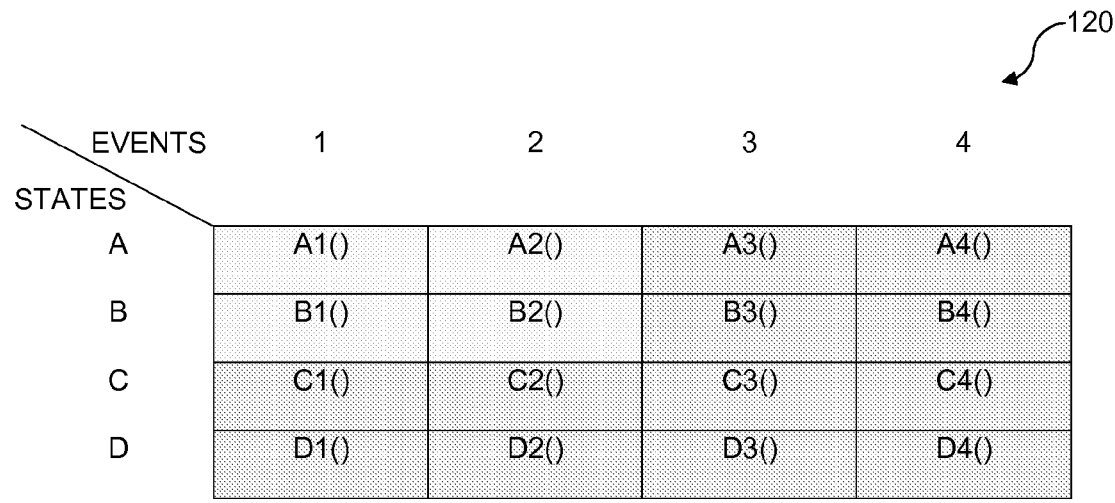
FIG. 2 shows a representation of a prior art static jump table for one of the subclass state machines of FIG. 1.

In the prior art, a state machine is in effect static. For the example shown generically in FIG. 1, this is demonstrated by the conventional static state event jump tables 120,130 shown schematically in FIGS. 2 and 3. The jump table 120 for the first leaf class state machine 102 is shown in FIG. 2. A 4×4 array of function pointers is provided, corresponding to the two states A, B which are inherited from the base class state machine 101 and the two further states C, D handled by the leaf class state machine 102 and, similarly, to the events 1, 2 which are inherited from the base class state machine 101 and the two further events 3, 4 handled by the leaf class state machine 102. The 4×4 array of function pointers is organized such that the indexes for the corresponding pair (state, event) are used to index the appropriate event handler. Typically the indexes for these states and events are normalized and sequentially arranged in the range of 0 to 3 (in this example where there are four states/events) to enable rapid access to the static array. The jump table 130 for the second leaf class state machine 103 is shown schematically in FIG. 3. In this case, the jump table 130 is represented by only a 4×3 array since it handles the two further states E, F beyond the two A, B which are inherited from the base class state machine 101 but only one additional event (event 5) beyond the two events 1, 2 which are inherited from the base class state machine 101. In the case of both of these tables 120,130 for the leaf or sub class state machines 102,103, the portion of the table defined by (i.e. inherited from) the base class state machine 101 can be seen in the four cells in the top left hand corner.

As mentioned, a state machine 100 using fixed state event jump tables is in essence static in that the association between pairs of states and events with event handlers is fixed when the computer program or software that uses the state machine 100 is compiled and/or installed. The association between pairs of states and events with event handlers can only be amended (by modifying the current associations and/or adding new associations in the jump tables) by rewriting the computer program and recompiling it and reinstalling it. In part at least, this is because the indexes for the states and events in the jump tables are conventionally arranged sequentially, i.e. in strict (typically numerical) sequence.

Examples of embodiments of the present invention allow a finite state machine to be amended effectively in real time, without requiring the computer program that uses or provides the state machine to be recompiled and/or reinstalled, and even while the state machine is running. The data identifying the association between the functions that are to be carried out for the different combinations of the states and the events is dynamically amendable. This data may effectively be stored as an associative array, which in this context is a data type composed of a collection of pairs of "keys" and the functions that are indexed by those keys. In exemplary embodiments, the functions (i.e. conceptually, labeling the address of the functions in the state machine jump tables or the like) are indexed using keys that are non-sequential and, in particular embodiments, using keys that are generated randomly or pseudorandomly. The keys in particular embodiments may be obtained from unique identifiers (which may for example be alphabetic or numeric or a combination of alphabetic and numeric) which are assigned to the various states and events that are handled and processed by the state machine.

A number of ways of achieving a dynamically amendable finite state machine are possible, in particular by having the functions or event handlers indexed by keys that are non-sequential. The keys may for example be generated in a random, or at least pseudorandom, manner by a number of techniques.

Figure 3:
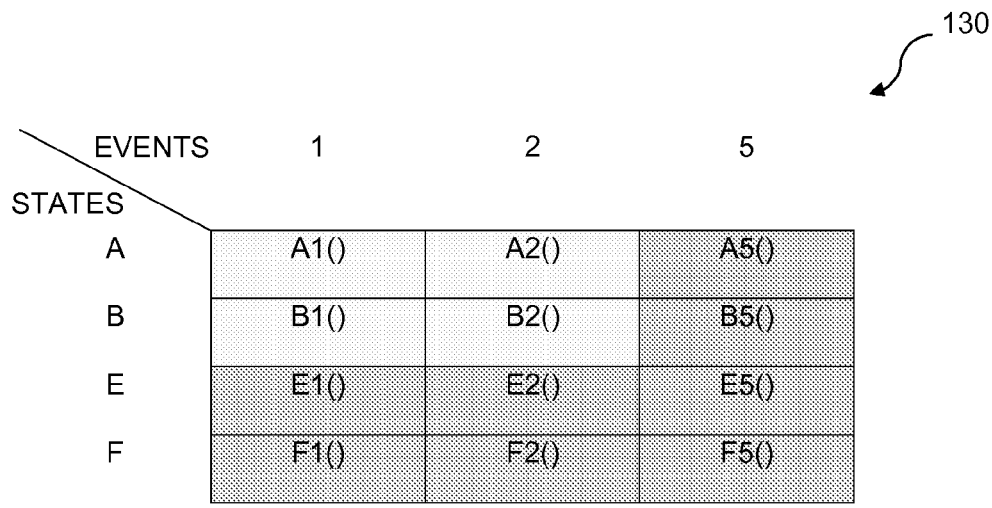
FIG. 3 shows a representation of a prior art static jump table for the other of the subclass state machines of FIG. 1.

As a particular example, instead of the static arrays of jump tables of the prior art, as shown schematically in FIGS. 2 and 3, an associative array in the form of hash tables may be used to organize the state-event jump table, with a set of nested associative arrays (for example in the form of nested hash tables) preferably being used. A hash table per se is a well documented programming construct, and can be regarded as a data structure that uses a hash function to map identifying values, known as keys (e.g. a person's name), to their associated values (e.g. their telephone number or address). Thus, a hash table implements an associative array. Hash functions per se are well known, and come in different forms using different algorithms depending on the particular application, and are used in this context to transform the key into the index (the hash) of an array element where the corresponding value can be found.

Figure 4:
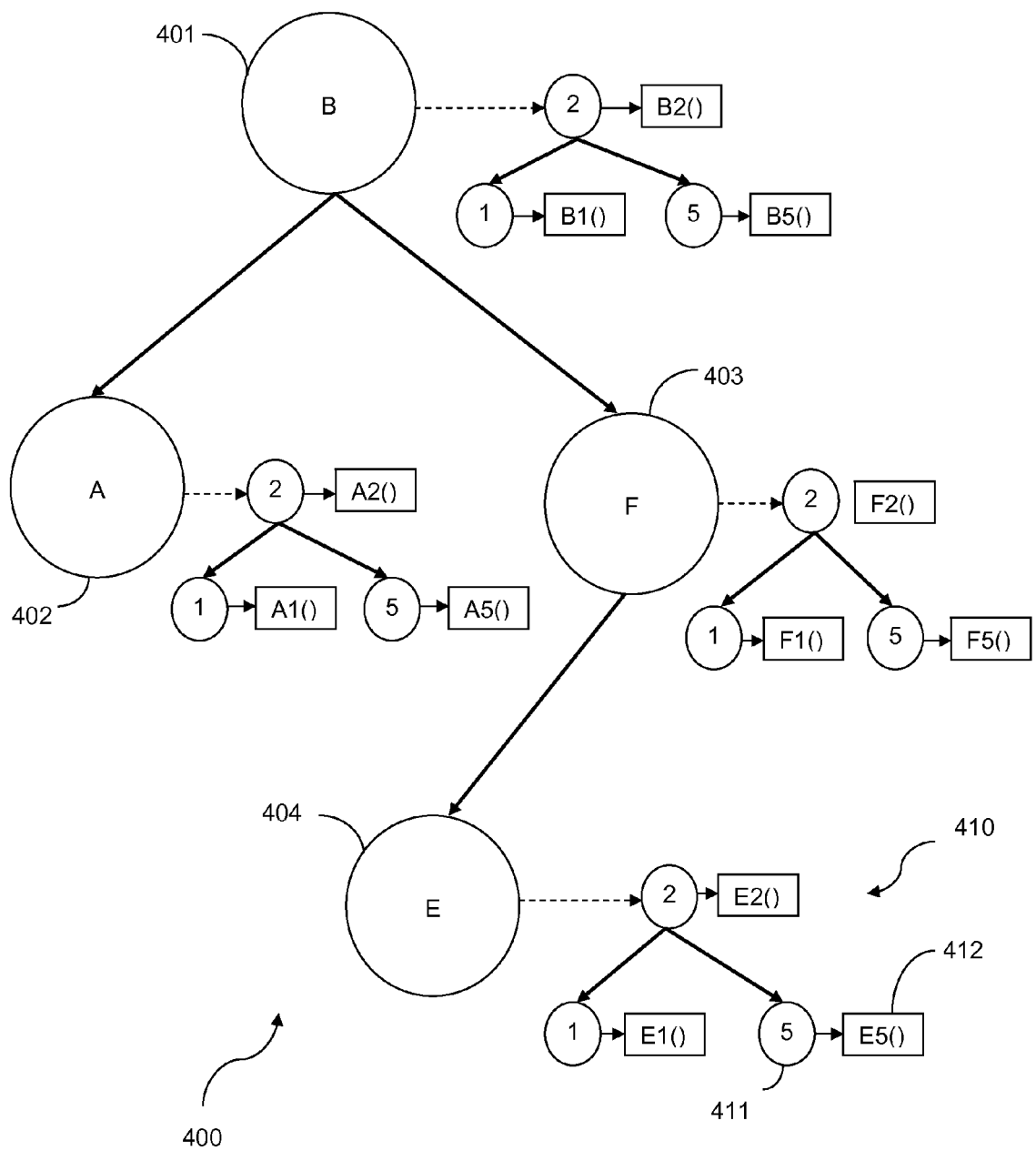
FIG. 4 shows a representation of a dynamic state machine jump table for an example of a state machine according to an embodiment of the present invention.

Associative arrays, including hash tables as a particular example, may be implemented in many different ways. FIG. 4 shows schematically an example of an associative array implemented as a binary tree 400 in an example of an embodiment of the present invention. Of particular relevance here is that with associative arrays in general, including hash tables in particular, data can be retrieved using a random key, and these keys do not have to be sequential in nature, and are not necessarily even numeric. In the example implementation as a binary tree shown in FIG. 4, the outermost nodes are shown by the larger circles and use the state's key to reach another particular node. The inner nodes are shown by the smaller circles and are keyed by the event in order to reach the corresponding function, which can then be executed. The table is organized for fast access by virtue of the tree structure and can be rebalanced as new nodes are added.

In this particular implementation of an associative array as a binary tree 400, in general a node has a data payload and two child nodes, a left child, and a right child. Thus, for example, the node 401 represented by state "B" is called the root node and has two child nodes 402,403. Nodes with a state whose key is less than "B" (in this case node 402 with state "A") are arranged on the left side, and nodes with a state greater than "B" (in this case node 403 with state "F") are arranged on the right. The data payload for any particular node in the case of an outermost node is another node, nested within that outer node and indicated by the smaller circles in FIG. 4. As mentioned, the key used for the inner nodes is based on the event trigger. The data payload for the inner nodes reference the correct function block or function pointer to the code that is to be executed.

The operation of the nested associative arrays or hash tables, in the form of a binary tree structure as shown schematically in FIG. 4, can be seen from the following example. Assume that State Machine 103 is in state "E", when it receives event 5. First the root node 401 is inspected and its key, "B", is compared to the current state "E". Since "E" is larger than "B", the rightmost node 403 is accessed. The key of the rightmost node 403 is "F", and since "E" is less than "F", its leftmost node 404 is accessed. This causes a match, since the key for this leftmost node 404 is "E". At this point, the corresponding event subtree 410 is accessed and the process is repeated using the key of the received event as a match. When the node 411 for event 5 is matched, the function 412 having reference E5( ) is executed and the state machine suspends, waiting for the next event to occur.

One of the principal advantages of this approach of using index keys that are non-sequential and preferably randomly generated, in particular and by way of example using associative arrays in the form of hash tables, is that the jump table and therefore the finite state machine as a whole is dynamic. The jump table can be modified or extended even while the system is running. States can be added or removed, and event handlers can be added, removed, or replaced, on-the-fly if necessary or desirable. The restrictions of the static jump tables of the prior art, including the inability to change the size of the jump table (to add or remove states and events and their corresponding event handlers) and to amend the way states and events are handled, are obviated.

In an example of embodiments of the present invention, a finite state machine can be dynamically amended by using an input file to introduce and/or redefine event handlers for states and events, without having to recompile the source code and/or reinstall the software that generates and operates the finite state machine. The input file is parsed to generate the necessary code blocks for the corresponding states and events which are then added to the jump table map at the respective indexes specified by the states and events.

In a particular example, State Chart XML: State Machine Notation for Control Abstraction (or "SCXML") is used to generate and operate the state machine. SCXML is an XML (eXtensible Markup Language) based language which provides a generic state machine based execution environment. SCXML builds on and extends Call Control eXtensible Markup Language (CCXML), which is an event-based state machine language designed to support call control features in voice applications. The baseline system supports the concept of metadata, whereby the methods, attributes, and class hierarchy are known to the program at runtime. With this knowledge, the system supports a scripting language that can invoke methods written in the native compiled language and, conversely, mechanisms exist in the native compiled language to invoke methods defined in the scripted language. As an object oriented system, methods and attributes defined in the scripting language can be added to existing objects defined in the native language, and new objects can be defined that exist within the scripting language and which can inherit from classes defined in the native language. The methods defined in the scripted language are represented in the compiled language as "code block" objects.

In SCXML, each SCXML <eventprocessor> tag defines a dynamic state machine object that is a subclass of some other state machine. These state machines, as mentioned above, inherit the states, events, and event handlers from their predecessor. They can then add new states, events and event handlers, and/or optionally overwrite an existing event handler. The software in the inherited base class may be written either in the native compiled language or may be another SCXML defined state machine class. As such, they can replace a natively compiled event handler function with one written in the scripting language (i.e. XML here).

Methods and attributes of all object classes, whether defined in the native language or in the scripting language, are added to the Metaclass object for that class. In an example where the input file is an XML file, the XML file defines a <transition> tag which specifies a code block for this state machine. The <transition> tag specifies a state and an event which tell the state machine when the code block is to be executed. XML tags within the code block represent the name of a method defined for the state machine object itself. These method names may be either natively compiled or defined in the scripting language. Parameters defined for these tags represent the names of the arguments that are defined in the method signature. The data for these arguments may be constant values, data from within the event, attributes saved in the state machine itself, or the result of a method invocation. As the XML file is parsed, these tags are converted into a scripting language code block. This code block is then added to the state machine jump table map at the indexes specified by the state and event. At runtime, if this event is received when the state machine is in the specified state, that code block is executed.

Figure 5:
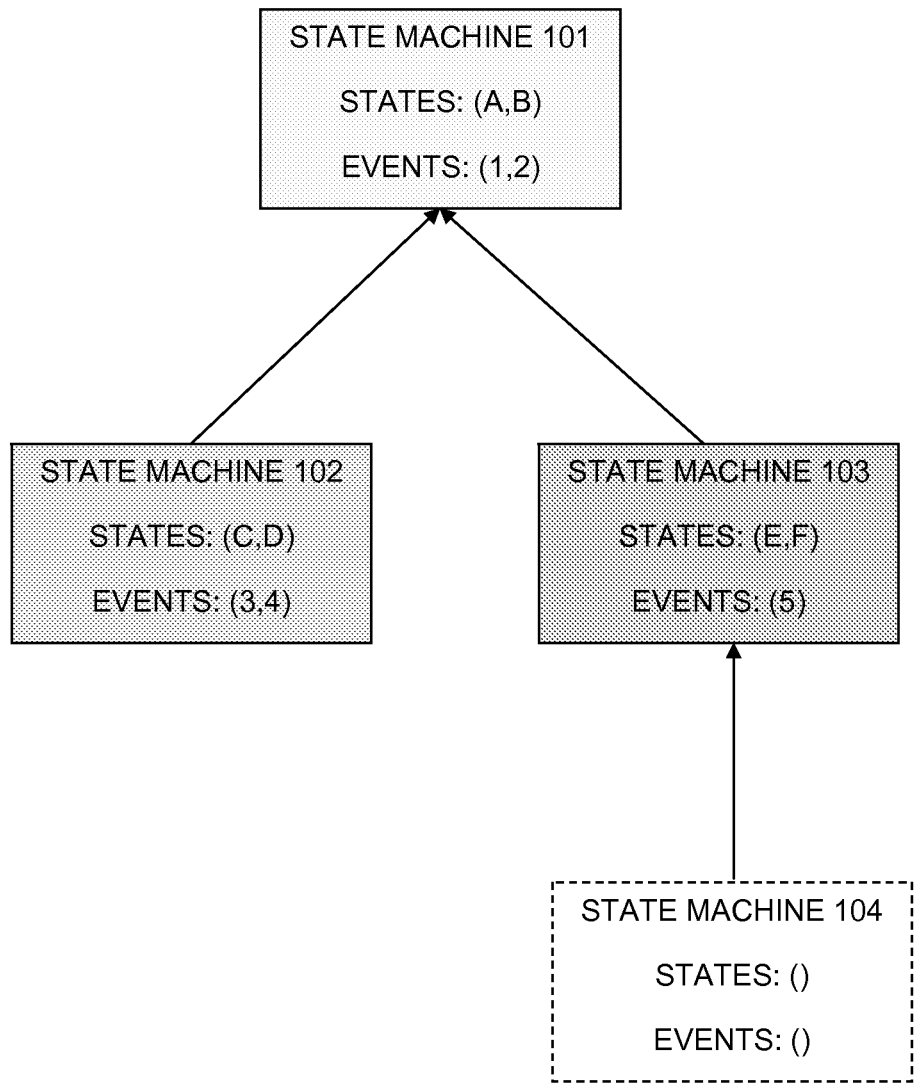
FIG. 5 shows the syntax of an example of an <eventprocessor> tag and how this dynamically defines a new subclass of state machine according to an embodiment of the present invention.
Figure 6:
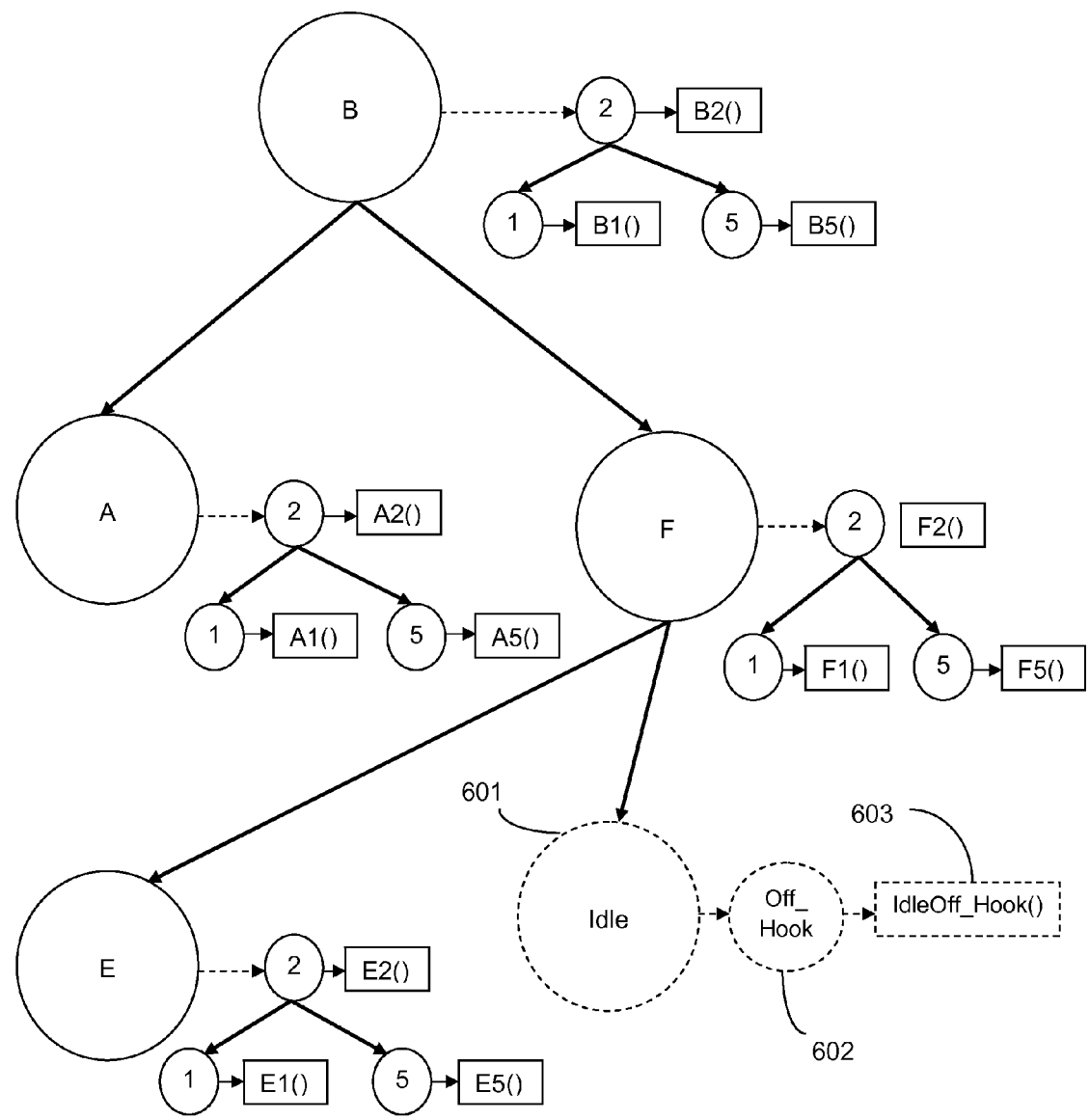
FIG. 6 shows the syntax of an example of a <transition> tag and how transitions dynamically extend the dynamic state table for a given class of state machine according to an embodiment of the present invention.
Figure 7:
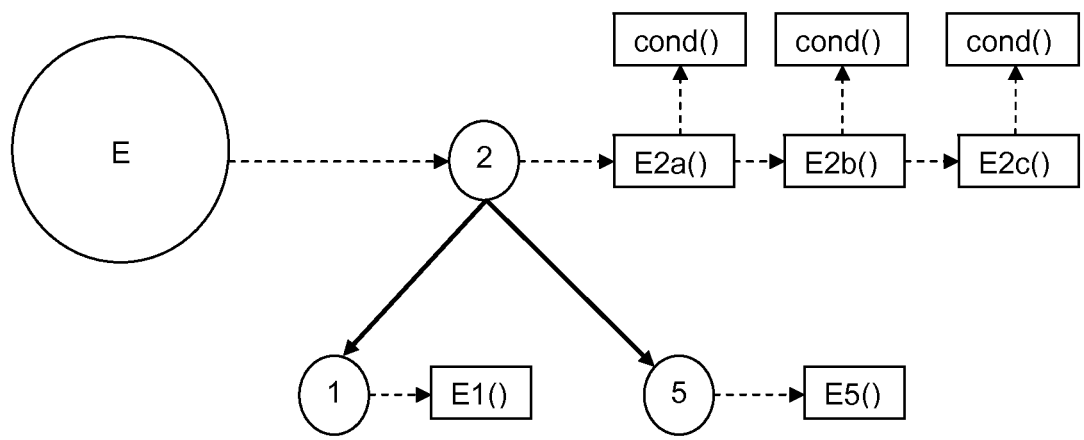
FIG. 7 shows schematically an example of how conditional expressions can be linked to a state event handler to dynamically select a different finite state machine behavior according to an embodiment of the present invention.

To illustrate this use of an input file to modify the operation of the finite state machine, particular examples are shown in FIGS. 5 to 7. FIG. 5 shows the effect of the <eventprocessor> tag upon the state machine hierarchy. In this example, the <eventprocessor> tag creates a new subclass of state machine that inherits its behavior from some class in a state machine hierarchy. In the example shown in FIG. 5, the <eventprocessor> tag is <eventprocessor name="STATE MACHINE 104" base="STATE MACHINE 103">. The effect of this is that a new state machine 104 is created and designed to inherit from the predecessor state machine 103. However, until any <transition> tags are processed, the jump table of new state machine 104 the looks just like the jump table of the predecessor state machine 103 as shown in FIG. 3 since no new states or event transitions have been defined as yet.

Thus, referring to FIG. 6, there is shown an example of a <transition> tag and its effect on the jump table. Referring back to the simple telephony example mentioned above, a new state, called "Idle" 601, and a new event, called "Off_Hook" 602, are introduced. An event <transition> of the form "<transition state="Idle" event="Off_Hook">" is written and is automatically inserted as the event handler code block 603 into the jump table as shown schematically in FIG. 6. The new portion of the table is shown as dashed lines in FIG. 6.

The algorithm or operation to insert a state/event handler may follow a similar logic to the algorithm that is used to find a state event handler itself and discussed above. First, the outer node is searched for a match on the state key. If no node is found, a new one is created and inserted into the tree in the appropriate spot (in this case, the rightmost child 601 of node "F"). Then the inner node is searched for a match on the event key. In this case, no event tree exists, so a new one is created, making the "Off_Hook" key the root node 602. A reference to the code block 603 that handles this state event transition is placed into the data payload for this new node. For completeness, event handlers for events 1, 2, and 5 are also added to this jump table using <transition> tags.

Two examples to illustrate the relationship between a method's signature and a corresponding SCXML tag are given below:

```
void StateMachine101::ForwardEvent(int delayInMs, char
*target) {...};
<ForwardEvent  target="'MySignallingStateMachine'"
delayInMs="50"/>
    void StateMachine101::SetState(char *state) {...}
    <SetState state="'Idle'" />
```

The top line in both cases is a method signature written in the programming language of the underlying system, which in this example is C++. The second line shows the corresponding method, invoked using an SCXML tag. It may be noted that the name of the tag is the method name, and that the name of the parameters in the tag are the names of the arguments in the method signature. All of these methods are defined within the state machine hierarchy so that the parser that reads the input XML file knows how to generate the underlying executable code.

Since the underlying system which constructs and runs the state machine has metadata, all of the information about this method, including its name, the names of its arguments, the data type of its arguments and the data type of the return value, are stored within the system at runtime. An example to illustrate how SCXML code blocks defined using the <transition> tag get converted into an executable code block is:

```
            <Transition state="Active" event="On_Hook" />
                <DisconnectAudio/>
                <ForwardEvent        target="'MySignallingStateMachine'"
delayInMs="50" />
                <SetState state="'Idle'" />
            </Transition>
            void StateMachine104::IdleOn_Hook( )
            {
            this->DisconnectAudio( );
            this->ForwardEvent('MySignallingStateMachine', 50);
            this->SetState('Idle');
            }
```

This shows the code block resulting from the examples of SCXML transition statements given above. This executable code block can be generated in the scripting language supported by the underlying system, or in the native programming language of the underlying system, to be compiled at a later time.

The SCXML parser, when it parses the body of a <transition> tag and encounters XML statements within the code block, will first obtain the tag name and then search the state machine metadata hierarchy for a function or a set of functions with the same name. The argument names are then compared against the arguments in each function signature obtained from the metadata until the appropriate match is found. It may be noted that this supports function overloading, i.e. it allows the creation of several methods with the same name which differ from each other in terms of the type of the input and the type of the output of the function. If the method is found, the XML tag is converted to the appropriate underlying syntax for the executable code. It may be noted that for XML, the parameters do not have to be in any particular order, but for the underlying code, the order of the arguments matches the order exactly as defined in the method signature.

An option is the ability to filter message handlers using a conditional expression. As a particular example to illustrate this, FIG. 7 shows schematically the SCXML syntax for the tag <transition /state="E" /event="2" / cond="fsm.MessgeCount >5"> and the resulting effect on the state machine jump table. The conditional expression is defined in the <eventprocessor> tag using a "cond" parameter. The expression is written in the underlying syntax of the scripting language, but can examine any piece of data or invoke any function in the underlying system that returns a Boolean value. In this manner, several state-event handlers can be defined for the same state-event combination. The conditions are examined in order and the first condition to return a Boolean value of "true" will be executed. The use of a conditional expression is optional. Only one state-event handler that has no condition is allowed, and it will be executed if no other conditions are met. It may be noted that in this case, the data payload for the innermost node is a list of function references rather than a single function reference.

Figure 8:
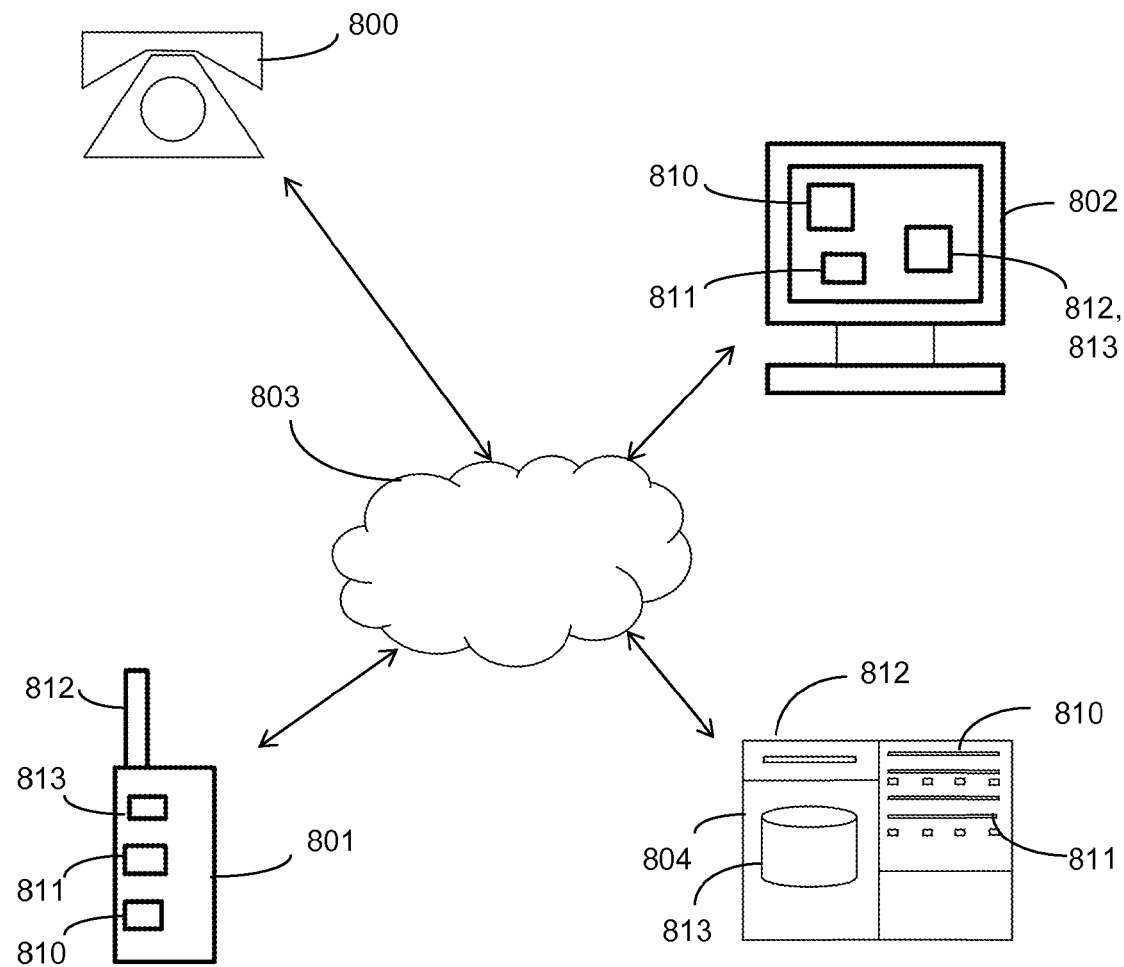
FIG. 8 shows schematically examples of devices incorporating and using finite state machines constructed and operated according to embodiments of the present invention.

FIG. 8 shows schematically examples of apparatus in or for which embodiments of the present invention may be implemented. There are shown a landline telephone 800, a mobile or cell phone 801 and a computing device 802, which may be a laptop or notebook or personal computer, etc., which can communicate with other apparatus or devices over a network 803. The network 803 may be wired or wireless or a combination or wired and wireless, and may for example be or include one or more of the internet, a local or wide access network (LAN and/or WAN), a public land mobile network (PLMN) and a public switched telephone network (PSTN).

Communications may involve one or more of a server or network control apparatus or exchange 804. In general, suitable telecommunications apparatus and devices may include wired and wireless telephones, satellite telephones, other personal communication devices, electronic gaming devices, electronic music devices, and telecommunications network infrastructure equipment, including but not limited to a base station and a telephone exchange. Such apparatus and devices will typically include one or more processors 810, memory/memories 811, antenna and/or other communications component and circuitry 812, etc. to enable communication with other devices and/or the network 803. The computer program or software described by way of example above will typically be stored in some non-transitory storage 813 on one or more of the apparatus or apparatus and run in memory 812 under control of the processor(s) 810.

Examples of embodiments of the present invention provide and make use of finite state machines that are hierarchical and have dynamic jump tables. In embodiments, the underlying system supports metadata and use of a scripting language to modify the jump tables. The specific examples described herein provide several advantages over traditional methods. For example, events and state keys do not have to be normalized to a common integer range; the same event can be handled by multiple finite state machines; designs can be rapidly implemented by using a library of base classes that provide common behavior; designs can be rapidly altered because of the dynamic nature of the jump tables, allowing requirements changes and bug fixes to be made quickly for example; and, state-event handlers can be simpler due to the addition of conditions to the state-event handler object.

Embodiments of the present invention may be used in may different fields and applications. Some specific applications where embodiments of the present invention may be used include telecommunications (such as in telephone system exchanges, base stations, radio network controllers, etc.), consumer electronics devices (including for example radios, televisions, smart phone "apps", etc.), and other computing devices and software in many different fields (including in email software, network protocols, computer languages and standards, databases, etc.).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc. The exemplary embodiments may be implemented at least in part by computer software stored in (non-transitory) memory and executable by the processor.

The above embodiments are to be understood as illustrative examples of the invention. Further embodiments of the invention are envisaged. For example, while the specific examples described above make use of associative arrays, particularly in the form of hash tables, and particularly using binary trees, other forms of associative array which use (key, value/function) pairs may be used. For example, associative arrays may be implemented in other embodiments in the form of so-called B-Trees, AVL trees, Red-Black trees, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method, comprising:
operating a finite state machine which causes a function to be carried out in dependence on at least an event input to the finite state machine and the current state of the finite state machine;
identifying associations between the functions that are to be carried out and combinations of the states and the events using an associative array; and
amending the associations identified using the associative array while the finite state machine is operating to dynamically reconfigure the operation of the finite state machine,
wherein the finite state machine is constructed using State Chart eXtensible Markup Language, the associations identified using the associative array being amended by receiving input of an eXtensible Markup Language file and parsing the XML file.

2. The method according to claim 1, wherein at least some of the associations identified using the associative array are indexed in the associative array by use of keys, the keys being non-sequential.

3. The method according to claim 2, wherein the keys are randomly or pseudorandomly generated.

4. The method according to claim 1, wherein at least some of the associations identified using the associative array are accessed using nested hash tables in which at least a first hash table has a second hash table nested therein, one of said hash tables storing identifiers of states of the finite state machine and the other of said hash tables storing identifiers of events.

5. The method according to claim 1, wherein the finite state machine is implemented on telecommunications apparatus.

6. A computing apparatus, comprising:
at least one processor; and
at least one memory,
wherein the processor and the memory are configured to cause the apparatus to operate a finite state machine which causes a function to be carried out in dependence on at least an event input to the finite state machine and the current state of the finite state machine, and
wherein associations between the functions that are to be carried out and combinations of the states and the events are identified using an associative array, the associations identified using the associative array being amendable while the finite state machine is operating to allow the operation of the finite state machine to be dynamically reconfigured,
wherein the finite state machine is constructed using State Chart eXtensible Markup Language, the associations identified using the associative array being amended by receiving input of an eXtensible Markup Language file and parsing the XML file.

7. The apparatus according to claim 6, configured such that at least some of associations identified using the associative array are indexed in the associative array by use of keys, the keys being non-sequential.

8. The apparatus according to claim 7, configured such that the keys are randomly or pseudorandomly generated.

9. The apparatus according to claim 6, configured such that at least some of the associations identified using the associative array are accessed using nested hash tables in which at least a first hash table has a second hash table nested therein, one of said hash tables storing identifiers of states of the finite state machine and the other of said hash tables storing identifiers of events.

10. The apparatus according to claim 6, wherein the computing apparatus is a telecommunications apparatus.

11. A non-transitory computer-readable storage medium comprising a set of computer-readable instructions stored thereon, which, when executed by a processing system, cause the processing system to carry out a method, the method comprising:

operating a finite state machine which causes a function to be carried out in dependence on at least an event input to the finite state machine and the current state of the finite state machine;

identifying associations between the functions that are to be carried out and combinations of the states and the events using an associative array; and amending the associations identified using the associative array while the finite state machine is operating to dynamically reconfigure the operation of the finite state machine, wherein the finite state machine is constructed using State Chart eXtensible Markup Language, the associations identified using the associative array being amended by receiving input of an eXtensible Markup Language file and parsing the XML file.

12. The non-transitory computer-readable storage medium according to claim 11, wherein at least some of the associations identified using the associative array are stored in a hash table, the index of the location of the data of each of said functions in the hash table being obtained as a hash of identifiers of the corresponding current state and event for said function.

13. The non-transitory computer-readable storage medium according to claim 11, wherein at least some of the associations identified using the associative array are indexed in the associative array by use of keys, the keys being non-sequential.

14. The non-transitory computer-readable storage medium according to claim 13, wherein the keys are randomly or pseudorandomly generated.

15. The non-transitory computer-readable storage medium according to claim 11, wherein at least some of the associations identified using the associative array are accessed using nested hash tables in which at least a first hash table has a second hash table nested therein, one of said hash tables storing identifiers of states of the finite state machine and the other of said hash tables storing identifiers of events.

* * * * *